United States Patent [19]
Howe et al.

[11] Patent Number: 4,865,443
[45] Date of Patent: Sep. 12, 1989

[54] OPTICAL INVERSE-SQUARE DISPLACEMENT SENSOR

[75] Inventors: Robert D. Howe, San Mateo County, Calif.; George Kychakoff, King County, Wash.

[73] Assignee: The Board of Trustees of the Leland Stanford Junior University, Stanford, Calif.

[21] Appl. No.: 60,766

[22] Filed: Jun. 10, 1987

[51] Int. Cl.$^4$ .............................................. G01C 3/08
[52] U.S. Cl. ........................................ 356/4; 354/403; 354/407; 354/408
[58] Field of Search .................... 356/4; 354/403, 407, 354/408; 350/96.10

[56] References Cited

U.S. PATENT DOCUMENTS

| | | | |
|---|---|---|---|
| 2,206,036 | 7/1940 | Herson. | |
| 3,512,888 | 5/1970 | Humphrey | 356/4 |
| 3,744,906 | 7/1973 | Sato et al. | 356/4 |
| 3,815,994 | 6/1974 | Peckham | 356/4 |
| 3,885,872 | 5/1975 | Howe et al. | 356/4 |
| 3,899,251 | 8/1975 | Frenk et al. | 356/4 |
| 4,011,403 | 3/1977 | Epstein et al. | 350/96.10 |
| 4,653,905 | 3/1987 | Farrar et al. | 356/4 |

Primary Examiner—Stephen C. Buczinski
Attorney, Agent, or Firm—Flehr, Hohbach, Test, Albritton & Herbert

[57] ABSTRACT

This invention comprises an optical displacement sensor that uses the inverse-square attenuation of light reflected from a diffused surface to calculate the distance from the sensor to the reflecting surface. Light emerging from an optical fiber or the like is directed onto the surface whose distance is to be measured. The intensity I of reflected light is angle dependent, but within a sufficiently small solid angle it falls off as the inverse square of the distance from the surface.

At least a pair of optical detectors are mounted to detect the reflected light within the small solid angle, their ends being at different distances R and R+ΔR from the surface. The distance R can then be found in terms of the ratio of the intensity measurements and the separation length as $$R = \frac{\Delta R}{(I_A/I_B)^{\frac{1}{2}} - 1}$$

4 Claims, 5 Drawing Sheets

OPTICAL INVERSE-SQUARE DISPLACEMENT SENSOR

This invention was made with United States Government support under Agreement No. DE-FG03-85ER13393, awarded by the Department of Energy. The Government has certain rights in this invention.

BACKGROUND OF THE INVENTION

Displacement measurements are important in many manufacturing operations, especially those relying on feedback control. Optical sensors are particularly useful in industrial settings because they can make non-contact measurements and are relatively immune to electrical and magnetic interference.

The sensing methods considered here are limited to non-contact approaches. This excludes approaches which require mounting or printing anything on the surface to be measured, even if there is no physical contact between the mounted object or pattern and the sensor—in particular, most interferometric techniques. Some techniques most comparable to the inverse-square sensor, with a range of a few millimeters to a few meters, 1 percent or better resolution, and measurement rates of at least a few hundred Hertz, are discussed below. Sensing schemes may be divided into non-optical and optical techniques. Non-optical techniques include ultrasound, capacitive, magnetic and eddy current. Optical techniques include sensitive volume, fiber surface reflection, triangulation, speckle, focus-contrast detection and echo ranging. A comparison of the important characteristics of each of these methods follows.

Ultrasonic range sensors (Dean Campbell, "Ultrasonic Noncontact Dimensional Measurement," *Sensors*, Vol. 3, No. 7, pp. 37-43, 1986) emit a pulse of high-frequency acoustic energy and measure the time for an echo to return from the measurement surface. Resolutions of $\pm 25$ $\mu$m out to 50 cm or $\pm 2$ cm up to 10 m away can be achieved by commercially available devices. The transducer's spot size is large (typically $\geq 15$ mm, even at close range), restricting resolution for surfaces with texture directional, reducing the returned pulse amplitude and thus sensitivity for inclined surfaces. A major problem is the variation of the speed of sound with air temperature; a change of 6C near room temperature causes a 1 percent change in the sound speed, with a proportional change in the measured distance. Calibration schemes employing a fixed reference object near the sensor can help with steady temperature drift, but thermal gradients between the sensor and the surface remain a problem. The sampling speed of these sensors is limited by the speed of sound; for example, a round trip to 50 cm requires 3 ms.

Electrical sensors such as capacitive, hall effect, and eddy current sensors generally require conductive or magnetic surfaces, which greatly restricts their applicability. Many commercial models are available, with a wide variety of ranges and resolutions.

The sensitive volume technique (Antal K. Bejczy, "Smart Sensors for Smart Hands," Paper 78-1714, AIAA/NASA Conference on "Smart" Sensors, Hampton, Va., Nov. 14-16, 1978) is similar to the inverse-square sensor only in that both are reflection-based amplitude sensing schemes. Illumination and collection optics look at intersecting volumes of space in front of the sensor. Illumination light is scattered into the collection optics when a surface is within the intersection volume. The quantity of light collected is a function of the distance to the surface and also of surface properties and illumination power. Useful range is up to about 8 cm, depending on sensor geometry. Construction of this sensor is somewhat simpler than the inverse-square sensor, but the results are surface dependent.

The fiber surface reflection sensor (D. E. N. Davies, J. Chaimowicz, G. Economou, and J. Foley, "Displacement Sensor Using a Compensated Fiber Link," in R. Kersten and R. Kist, eds., *Second Intl. Conf. on Optical Fiber Sensors*. Sept. 5-7, 1984, pp. 387-390; Charles M. Davis, "Fiber Optic Sensors: an Overview," in *Fiber Optic and Laser Sensors II*, Proc. of SPIE Vol. 478, pp. 12-18; Gregory Hull-Allen, "Reflectivity Compensation and Linearization of Fiber Optic Probe Response" in *Optical Systems Engineering IV*, Proc. of SPIE Vol. 518, pp. 81-85; Leo Hoogenboom, G. Hull-Allen and Steven Wang, "Theoretical and Experimental Analysis of a Fiber Optic Proximity Probe," in *Fiber Optic and Laser Sensors II*, Proc. of SPIE Vol. 478, pp. 46-57; N. E. Lewis, M. B. Miller, W. H. Lewis, "Fiber Optic Sensors Utilizing Surface Reflections," in *Fiber Optic and Laser Sensors II*, Proc. of SPIE Vol. 478, pp. 39-45) is also reflection based. One or more pairs of optical fibers are mounted next to each other, with light emerging from one of the pair. In the most common arrangement, the fibers are within about a fiber diameter of a surface, and the amount of light gathered by the collection fiber is a function of the distance to the surface. Several compensation schemes have been proposed to eliminate dependence on surface properties. The useful range for this sensor is only up to about 2 mm, with less than 0.1% error.

Laser triangulation determines distance by measuring the apparent lateral position of a spot of light projected onto a surface at an oblique angle (James T. Luxon and D. E. Parker, *Industrial Lasers and Their Applications*, Prentice-Hall, pp. 154-157). Many configurations of the light source and detector are used; the most accurate approaches use several sources and detectors, which can also provide surface orientation information (M. Fuhrman and T. Kanade, "Design of an Optical Proximity Sensor Using Multiple Cones of Light for Measuring Surface Shape," *Opt. Eng.* 23 (5) 546-553, 1984). Accuracies of $\pm 50$ $\mu$m over 5 cm or $\pm 1$ $\mu$m over 2 mm at rates of several kHz are quoted in product literature ("Optical Systems Featured," *Sensor Review* Vol. 5, No. 3, pp. 172-174, 1985).

Several schemes for sensing distance with speckle have been used (Atul Jain, "System for relative motion detection between wave transmitter-receiver and irregular reflecting surface," U.S. Pat. No. 4,210,399, 1/10/77; Akihiro Hayashi and Yoichi Kitagawa, "High-resolution rotation-angle measurement of a cylinder using speckle displacement detection," *Appl. Opt* Vol. 22, No. 22, pp. 3520-3525, 1983; Nobukatsu Takai and Toshimitsu Asakura, "Displacement measurement of speckles using a 2-D level crossing technique," *Appl. Opt* Vol. 22, No. 22, pp. 3514-3519, 1983). Most measure relative displacement, and require averaging many speckle cells in order to achieve reasonable accuracy. These techniques have not been proven in industrial settings.

The focus contrast sensor forms the basis of the autofocus feature found on some cameras. In one approach suited to industrial displacement measurement (Distance "Sensing Uses Automatic Focusing Technology," *Sensor Review* Vol. 4, No. 4, pp. 172-173, 1984), a row of light detector pairs looks out through a lens at the subject to be ranged. The detectors measure the local contrast in the scene at the focal plane and from this a microprocessor determines the distance between the subject and the front focal plane. An accuracy of about 5 percent is typical for a fixed-focus lens, but this can be substantially increased with a variable focus lens. The main drawback of this approach is the need for a subject with substantial optical contrast.

Echo ranging with light is similar to ultrasound: a short pulse of light is directed at the surface to be ranged, and the travel time for the reflected pulse to return gives the distance. Because light travels at about 3 ns per meter, very fast and expensive electronics and light sources are required to provide sub-meter resolution. This technique is best suited for the 10 m to 1 km range, with $\geq 0.5$ m resolution.

The two techniques with range and resolutions most comparable to the inverse-square approach of this invention are ultrasonic ranging and laser triangulation. Ultrasound has similar range and resolution, but a larger beam diameter and poor performance on tilted surfaces. It is also sensitive to environmental effects. Laser triangulation can produce better resolution over a given range, but the sensor is more expensive and complicated. The inverse square scheme of this invention is much less expensive in systems where multiple range measurements must be made simultaneously, since one light source and detector can service a large number of sensors, and the incremental cost of adding each sensor is small.

An integrated optical sensing system architecture can meet many industrial sensing needs (G. Kychakoff, P. H. Paul and R. K. Hanson, "Fiber Optic Sensor System for Industrial Monitoring Applications," in *Technical Digest of the Conference on Lasers and Electrooptics*, 1984, Optical Society of America, Wash. D.C., pp. 132-133). Light from a single light source is directed by an electrooptic multiplexer to a number of sensor locations via optical o fibers. After interaction with the industrial process, the returned light is demultiplexed and preprocessed before computer acquisition. This scheme permits a single light source and detection system to access multiple points simultaneously, and keeps delicate optical components away from the factory environment. It also provides for simple extension or modification of the sensors and sensing system.

It is a primary objective of this invention to provide an improved non-contact displacement sensor. More particularly, it is an objective herein to provide an improved non-contact sensor having a reasonably long range and high resolution.

A further objective herein is to provide a displacement sensor which is useful for studying tilted or rounded surfaces.

In summary, this invention comprises a simple, inexpensive optical displacement sensor that uses the inverse-square attenuation of light reflected from a diffused surface to calculate the distance from the sensor to the reflecting surface. More particularly, light emerging from an optical fiber or the like is directed onto the surface whose distance is to be measured. The intensity I of reflected light is angle dependent, but within a sufficiently small solid angle it falls off as the inverse square of the distance from the surface.

In a preferred embodiment, at least a pair of optical detectors are mounted to detect the reflected light within the small solid angle, their ends being at different distances R and R+$\Delta$R from the surface. The distance R can then be found in terms of the ratio of the intensity measurements and the separation length as $$R = \frac{\Delta R}{(I_A/I_B)^{\frac{1}{2}} - 1}$$

The approach disclosed herein reduces dependence on surface properties and illumination power, and hence, eliminates the need for elaborate calibration of the sensor.

The sensor may be designed to form part of a comprehensive optical sensing system. A single light source can be used to drive a large number of the sensors. Arrays of these devices to sense curvature or orientation of the surface can be built easily and inexpensively. The device is thereby particularly suited to applications which require simultaneous displacement measurements at multiple locations.

Although this invention is described with respect to the use of a laser as the light source, other sources may be used efficiently, preferably being highly collimated and nearly monochromatic. Also, the use of fiber optics is not required as other detectors may be efficiently used.

A preferred form of this invention will be described with reference to the following figures.

DETAILED DESCRIPTION OF A PREFERRED EMBODIMENT

Figure 1:
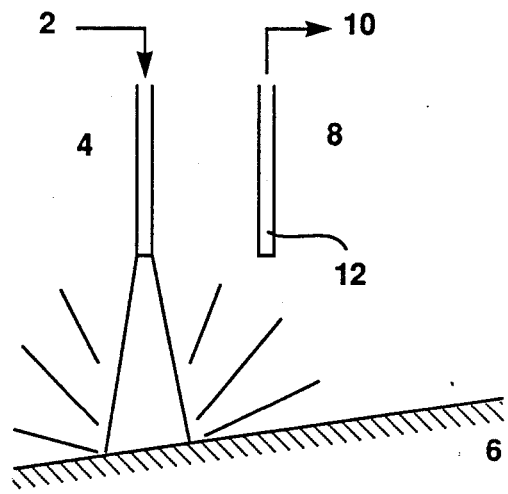
FIG. 1 is a schematic diagram of a single collection fiber displacement sensor.

The sensing scheme of this invention is based on the inverse-square attenuation of light reflected from a diffused surface. Thus, in the simplest form of this invention, light, preferably from a nearly monochromatic light source 2 is transmitted through an illuminating fiber 4 and emerges to strike a diffused surface 6. As illustrated in FIG. 1, the surface, whose distance is to be measured, does not need to be perpendicular to illuminating fiber 4, rather it may be tilted, or even rounded.

The light reflected from the surface 6 within a small solid angle is reflected to a collection fiber 8 and transmitted to a detector 10. It should be noted that other types of optical detectors may be substituted for the collection fiber detector 8 shown in this preferred example.

The intensity of the reflected light captured by collection fiber 8 varies as the inverse square of the distance from the surface 6. The distance from the surface 6 to the collecting end or surface 12 of collection fiber 8, which serves as the detector, will be calculated as discussed below. The detector 10 that performs the calculation also takes into account the extent to which the magnitude of the collected signal is affected by surface properties and laser power.

The intensity I of the reflected light is angle dependent, but within a sufficiently small solid angle, it falls off as the inverse square of the distance from the surface and therefore, the distance from the surface R may be calculated according to the function $I=I_o/R^2$ where $I_o$ is the intensity measured at unit distance. Inversion of this formula gives R as the function of the measured intensity I. However, $I_o$ is a function of, among other things, surface properties such as color and finish as well as the power of the incident light. Thus, a sensor for a single collection fiber or using a single collection fiber requires recalibration for each surface and normalization for variations in laser power.

Figure 2:
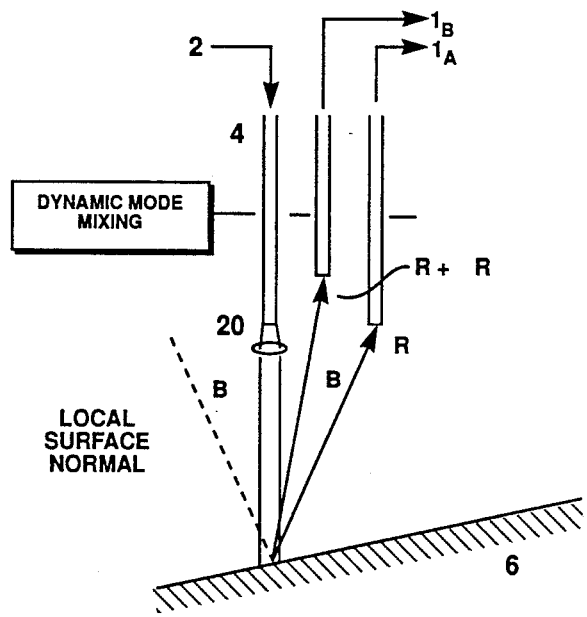
FIG. 2 is a schematic diagram of two collection fiber displacement sensors employing the ratio technique.

This difficulty can be largely eliminated if the ratio of two such measurements are used to compute the distance R. Two fibers, labelled A and B in FIG. 2, are arranged so that their ends are at different distances R and $R+\Delta R$ from the surface. To focus the light more clearly on the diffused surface, a collimating lens 20 is provided at the output of the illumination fiber 4. The collected intensities are then $$I_A=I_{OA}/R^2, I_B=I_{OB}/(R+\Delta R)^2.$$

If the fibers A and B are mounted almost colinearly, so that they collect light scattered into the same solid angle $\theta$, then the intensity will vary only as a function of the distance R, and $I_{OA}=I_{OB}=I_O$. The factor $I_O$ is thereby eliminated, and the distance R expressed in terms of the ratio of the intensity measurements and separation length as $$R = \frac{\Delta R}{(I_A/I_B)^{\frac{1}{2}} - 1}$$

Several geometric considerations enter into the design of a working distance probe. The fibers must be arranged so that the closer of the two collection fibers A, B does not obstruct the reflected light from reaching the more distant fiber. The illumination 4 and collection fibers A, B are most conveniently mounted adjacent to each other so this requirement is easily met if the illumination fiber is next to the distant collection fiber B, i.e., the closer collection fiber must not be interposed.

It is important to keep the illumination spot size on the surface as small as possible. While a step-index optical fiber collects essentially all the light reaching it from within its acceptance cone, it is difficult to insure that the projected cones of the illumination and collection fibers are registered over the measurement range. Also, a large spot size reduces measurement resolution on tilted or textured surfaces. These problems are minimized if a lens 20 is used to collimate or loosely focus the illumination beam. A depth of focus calculation will determine the best focal length based on fiber properties and measurement range (K. Iizuka *Engineering Optics*, Springer-Verlag, 1983; NSG America 81, *SELFOC Handbook*, NSG America, Inc., Clark, New Jersey, 1981).

Nearly any light source which can be coupled into an optical fiber can be used as the illumination source for this sensor. In many applications it will be desirable to use monochromatic light, so that spectral filtering can discriminate against ambient light collected by the fibers. Light-emitting diodes, metal vapor lamps, and lasers are good candidates for this purpose.

Use of a laser entails an additional difficulty. Because laser light is coherent, self-interference produces speckle—a rapid spatial modulation of the intensity of the scattered light. The pattern of light striking a surface some distance from the illumination fiber end consists of a larger spot composed of many small spots due to interference between various fiber modes which undergo different propagation delays in the fiber. For a given spatial configuration of the illumination fiber, the phase differences between the modes are fixed, and the reflected light is modulated in both radial and angular directions by a static speckle pattern. This I0 modulation is superimposed on the inverse-square variation of the reflected light, so sensor performance is degraded.

Our solution to this problem is to use dynamic mode mixing in the light source fiber to effectively average over a large number of speckle patterns. As an optical fiber is bent, energy is redistributed among modes within the fiber. This alters the amplitude distribution of the light striking the measurement surface, effectively making the small spots appear and disappear within the fixed large-diameter spot. This, in turn, changes the speckle pattern at the collection fibers, making the speckle cells disappear and reappear at new positions. If the bending motion is repeated many times during each measurement interval, the intensity of scattered light averaged over several cycles includes many different speckle patterns. The measured intensity then follows the inverse-square law along a small solid angle, so this sensing scheme can be used with a laser light source.

The inverse-square sensor relies on the approximation that the difference between the collected intensities $I_A$ and $I_B$ is due only to the difference in radial displacement $\Delta R$. If the scattered light at a fixed radius varies in the angular direction on the scale of the separation of the collection fibers, then the sensor's performance will be degraded. An analysis of accuracy limits posed by angular dependence follows.

Real surfaces do not scatter light uniformly into each direction. This nonuniformity can degrade sensor performance by convolving the radial inverse-square attenuation of the reflected intensity with an angular variation. The following analysis derives accuracy limit of the sensor as a function of the lateral fiber separation and the reflectivity function of the surface. A modified configuration of the sensor which circumvents this difficulty is also disclosed.

The error in the measured distance as a function of the separation between the collection fibers is of primary interest. Assume that at a given distance R the scattered light intensity I(R) is a function $F(\theta)$ of the angle $\theta$ between the surface normal at the light spot and the direction to the collection fiber (FIG. 2). Then the intensity collected by fibers A and B with ends located at the points $(R,\theta)$ and $(R+\Delta R, \theta+\Delta\theta)$ can be described as $$I_A = \frac{F(\theta)}{R^2}, I_B = \frac{F(\theta+\Delta\theta)}{(R+\Delta R)^2}$$

The measured value $R'$ for the distance to the surface is $$R = \frac{\Delta R}{(I_A/I_B)^{\frac{1}{2}} - 1}$$

Let $\epsilon = 1 - R'/R$ be the error in the measured distance $R'$ with respect to the actual distance $R$. This error is $$\epsilon = 1 - \frac{(\Delta R/R)}{\left[\frac{F(\theta)}{F(\theta+\Delta\theta)}\right]^{\frac{1}{2}} \frac{(R+\Delta R)}{R} - 1}$$

The separation angle can be expressed in terms of the lateral separation s of the fibers and the distance R as $\Delta\theta = s/(R+\Delta R)$. Then, for a given surface reflectance function, the error in distance measurement at any R is calculated as a function of sensor parameters $\Delta R$ and s.

For many diffuse surfaces, a good first order model for reflectance describes the relative intensity of light scattered into a given angle $\theta$ as a combination of Lambertian and specular components, or $$F(\theta) = F_L(\theta) + F_S(\theta)$$

The Lambertian component is written $F_L(\theta) = F_{LO} \cos\theta$, corresponding to the geometric extinction of omnidirectionally scattered light when viewed from the angle $\theta$. The specular component is the highly directional mirror-like reflection, typically of small angular width. Because it varies rapidly within this small angular range, it is desirable to arrange the illumination and collection fibers to collect as little of this light as possible. It is most convenient to keep the collection and illumination fibers adjacent, so for many surfaces the specular component can be avoided by orienting the probe at an angle greater than about 10° from the surface normal. This means that the collection fibers are 20° from the center of the specular reflection, where the intensity from the specular component is negligible. The angular reflectance function of the surface can then be approximated by a cosine alone.

Figure 3:
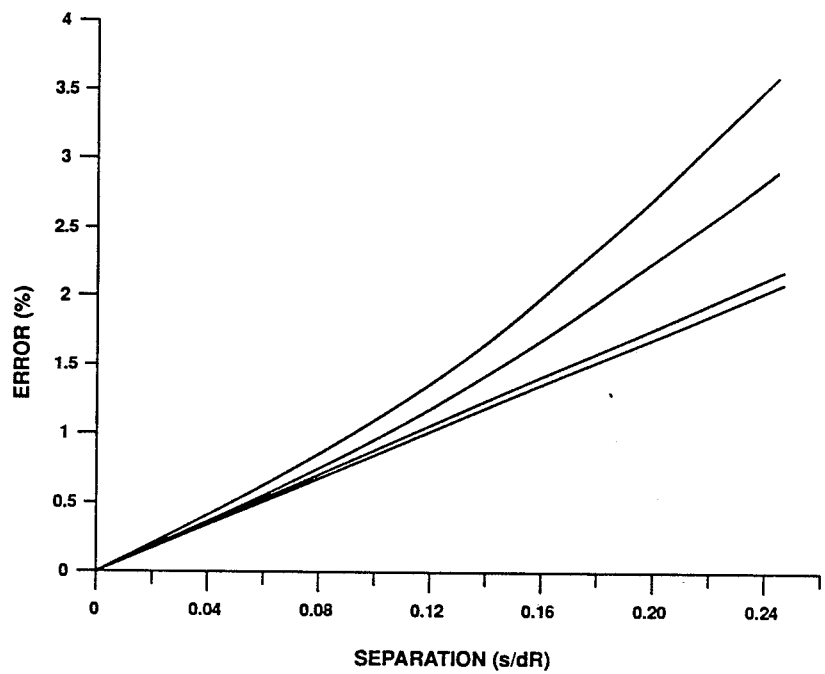
FIG. 3 illustrates the distance measurement error due to angular variation in scattered light.
Figure 4:
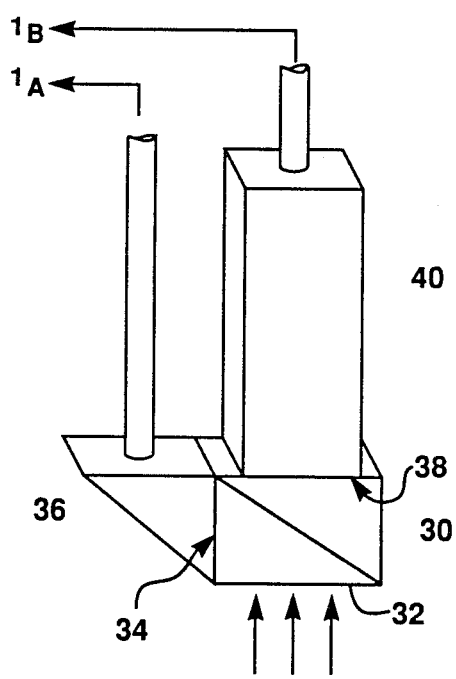
FIG. 4 illustrates a single aperture sensor using a beam splitter to provide the reflected light to each of two collection fibers.

FIG. 3 illustrates the error in the distance measurement as a function of distance, calculated using the cosine reflectance function. The error is largest at close distances, where the angle subtended by a fixed fiber separation is largest. For large $R/\Delta R$ and small $s/\Delta R$, the error approaches the constant value $$\epsilon \simeq \frac{2(s/\Delta R) \tan\theta}{1 - 2(s/\Delta R)\tan\theta} \simeq 2(s/\Delta R)\tan\theta$$

Thus $\Delta R$ must be considerably larger than s to minimize angular error, even at large distances. Since $\Delta R$ is determined by other considerations (see next sections), the lateral separation should be kept as small as construction techniques permit, and the sensor should be mounted as close to perpendicular as possible while avoiding specular reflections. Each curve in FIG. 3 shows the variation in measurement error at a fixed distance $R/\Delta R$ as a function of the collection fiber end separation distance $s/\Delta R$. Calculations are for a Lambertian surface viewed from an angle $\theta = 10°$.

One method of avoiding the error due to angular variation of the scattered light, at the expense of more complex and expensive sensor construction, is to permit both collection fibers to view the same solid angle of reflected light by using a beam splitter 30 (FIG. 40). Light enters through the bottom face 32 of a small cube beam splitter 30, where it is divided into two components. One component exits through the side 34 of the beam splitter 30 into a 45 degree prism 36, which reflects the light into collection fiber A. The other component passes out of the top 38 of the beam splitter, through a glass spacer 40, and into fiber B. The length of the spacer 40 and its refractive index sets the radial separation distance $\Delta R$. Care must be taken in the optical design to avoid collecting reflections from the faces of the optical elements, which could contribute to distance measurement errors.

In addition to eliminating angular differences between the fibers, this configuration minimizes the degradation of sensor performance due to dirt on the optical surfaces. Changes in the transmission of the bottom face of the beam splitter are divided out when the ratio of the intensity measurements is taken.

The specification of an application will usually consist of $R_{min}$ and $R_{max}$, the minimum and maximum distances to be measured; $\epsilon_{max}$, the maximum error in the measured distance over this range, and $\tau$, the maximum time interval for the measurement. The optical sensing system of which this sensor forms a part will often dictate the choice of optical parameters such as the laser wavelength $\lambda$, the collection fiber diameter d, the collection optics transmissions), $\eta_{opt}$ (including fiber and spectral filter transmissions, and the quantum efficiency $\eta_{qe}$ of the detector used to convert the collected light to an electrical signal. These specifications determine the optimum fiber end separation $\Delta R$, the laser power-detection time product and the required detection resolution.

A fundamental limit on sensor accuracy is imposed by the shot noise of the detected light signal. The intensity $I(R,\theta)$ on the collection fiber end at the point $(R,\theta)$ is $$I(R,\theta) = \frac{\text{(incident illumination power)} \times \text{(surface reflectance function)}}{R^2}$$

For a Lambertian surface viewed from a maximum angle $\theta$ with respect to the surface normal, this can be written $$I(R,\theta) = \frac{P_o \rho \cos\theta}{R^2}$$

where $P_o$ is the laser power incident on the surface, and $\rho$ is the surface reflectivity. The number of electrons in the detected signal is $$n_e = \frac{I(R,\theta) A \tau \eta}{(hc/\lambda)}$$

where $A = (\pi/4)d^2$ is the collection fiber end area, $\tau$ is the averaging time for the detected signal, $\eta = \eta_{opt} \eta_{qe}$ is the efficiency of the optical detection system, and $(hc/\lambda)$ is the photon energy. For a shot noise limited intensity measurement, the fractional error in the measurement is $$\frac{\Delta I}{I} = \frac{n_e^{1/2}}{n_e} = \frac{2\pi R^2 (hc/\lambda)^{\frac{1}{2}}}{P_o \tau A \eta \rho \cos \theta} = R k,$$

where $k = \frac{2\pi (hc/\lambda)^{\frac{1}{2}}}{P_o \tau A \eta \rho \cos \theta}$ The error in the distance measurement may be found in terms of this intensity measurement error. The intensity measurement for fiber B will be the one limited by shot noise, since it is farther from the surface than A. The measured intensity $I_B'$ can be expressed as the sum of the actual intensity and the error, or $I_B' = I_B + \Delta I$. The measured distance R' is $$R' = \frac{\Delta R}{(I_A/I_B)^{\frac{1}{2}} - 1} = \frac{\Delta R}{[I_A/(I_B + \Delta I)]^{\frac{1}{2}} - 1}$$

Since $(I_A/I_B)^{\frac{1}{2}} = 1 + (\Delta R/R)$. Also, $\epsilon = 1 - (R'/R)$; therefore $$\epsilon = 1 - \frac{(\Delta R/R)(1 + \Delta I/I_B)^{\frac{1}{2}}}{(1 + \Delta R/R) - (1 + \Delta I/I_B)^{\frac{1}{2}}}$$

If $\Delta I << I_B$, then $(1+\Delta I/I_B)^{\frac{1}{2}} \approx 1 + (\Delta I/I_B)^2$. Substituting for $(\Delta I/I_B)$ from above, and noting that for fiber B, $R = R_{max} + \Delta R$, $$\epsilon = 1 - \frac{1 + (k/2)(R_{max} + \Delta R)}{1 - (k/2)(R_{max} + \Delta R)(R_{max}/\Delta R)}$$

Figure 5:
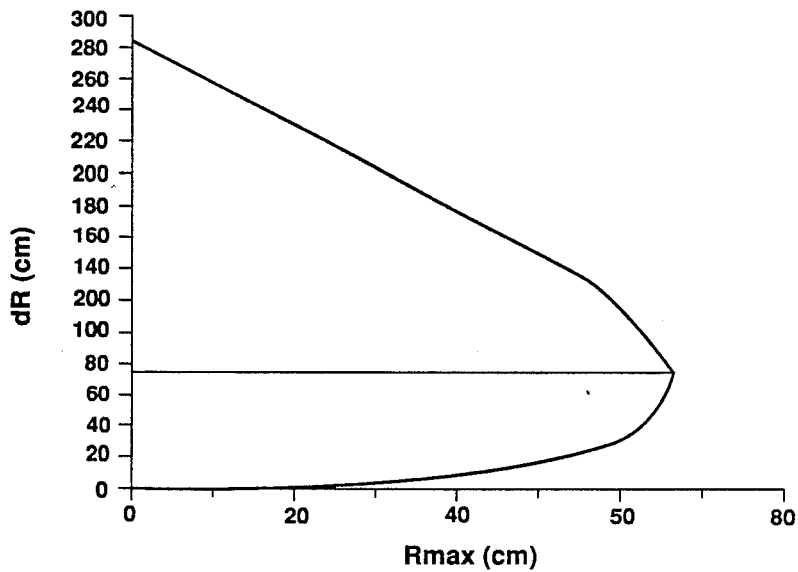
FIG. 5 illustrates separation distance $\Delta R$ as a function of maximum measurement distance $R_{max}$.

This is a quadratic expression for $\Delta R$ in terms of k, $\epsilon$, and $R_{max}$, which yields $$\Delta R = -b \pm (b^2 - (1-\epsilon) R_{max}^2)^{\frac{1}{2}},$$
where $b = (R_{max}/2)(2-\epsilon) + (1/k)\epsilon.$ The positive and negative roots are the largest and smallest values of $\Delta R$ which will satisfy the error limit $\epsilon_{max}$ for the given $R_{max}$ and optical and surface parameters k. The lower limit is the point where the ratio of the two intensity measurements is so close to unity that shot noise limits accuracy, while the upper limit is the point where the B fiber intensity signal becomes so weak that shot noise limits accuracy. FIG. 5 is a graph of $\Delta R$ as a function of $R_{max}$ showing the upper and lower limits. The upper and lower curves represent maximum and minimum values of $\Delta R$ which will satisfy the given error limit at each $R_{max}$ due to signal shot noise. Central line is optimum value for $\Delta R$ because it satisfies error limit over largest $R_{max}$. Curves were calculated for an error $\epsilon \leq 1.0\%$, $\lambda = 630$ nm, $(P_o \tau) = 5 \times 10^{-5}$ joules, $A = 0.78$ mm$^2$, $\eta_{opt} = 36\%$, $\eta QE = 40\%$, and a Lambertian surface with $\rho = 0.8$ and $\theta = 10°$.

The maximum value of $R_{max}$ for which the given parameters $\epsilon$ and k hold is the point where the two limits are equal. This is where the determinant $(b^2 - (1-\epsilon)R_{max}^2)$ goes to zero, so $$R_{max} \leq \frac{2}{k} \frac{-\epsilon}{\epsilon - 2(1-\epsilon)^{\frac{1}{2}} - 2}$$

The value of $\Delta R$ corresponding to this largest $R_{max}$ is optimum in the sense that it will work for th greatest range of distance; this $\Delta R$ is found from substituting this expression for $R_{max}$ into the equation for $\Delta R$ above, yielding $$\Delta R = \frac{\epsilon}{k} \left[ \frac{(\epsilon - 2)}{\epsilon - 2(1-\epsilon)^{\frac{1}{2}} - 2} - 1 \right]$$

In designing a sensor for a given set of specifications, $R_{max}$ is known, and what is desired is to find the minimum value for the laser power and signal averaging time that will meet this specification. Solving the above equation, which gives $R_{max}$ in terms of $\epsilon$ and k (or $\epsilon$, $P_o$, $\tau$, A, $\eta$, $\lambda$, $\rho$ and $\theta$), for the product $(P_o \tau)$, yields $$(P_o \tau) \geq \frac{\epsilon - 2(1-\epsilon)^{\frac{1}{2}} - 2}{\epsilon} \frac{R_{max} \pi (hc/\lambda)}{2 A \eta \rho \cos \theta}$$

Figure 6:
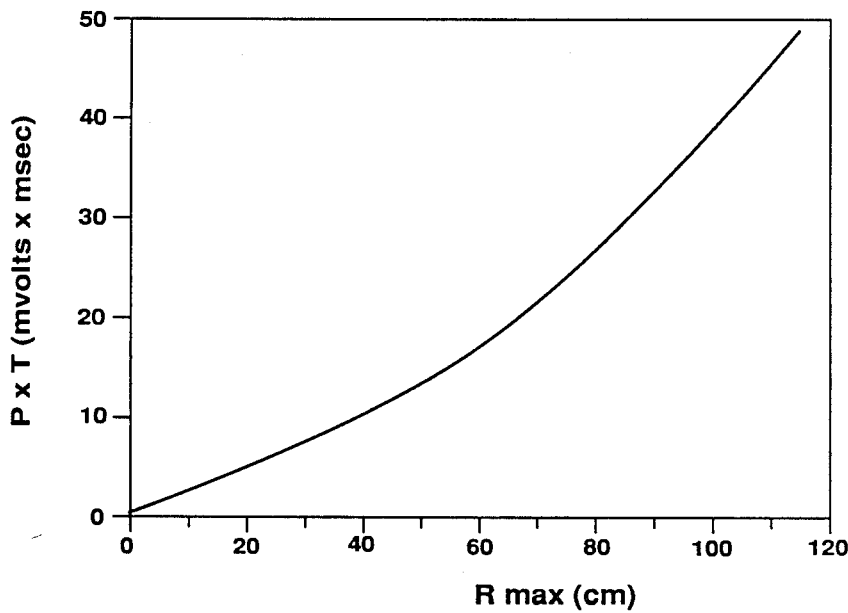
FIG. 6 illustrates the minimum laser power averaging time product as a function of maximum measurement distance $R_{max}$.

This allows us to find the minimum laser power-averaging time product for a specified maximum distance and optical and surface parameters. A graph of this product as a function of $R_{max}$ for typical optical and surface properties is given in FIG. 6, using the same parameters as FIG 5. Once the power and averaging time have been determined, the optimum value for $\Delta R$ can be found as above.

Next, the detection system resolution required to make the measurement can be determined. Here the limit is posed by the dynamic range needed to follow the rapid inverse-square diminution of intensity over the measurement range. Fiber A will be considered because the range of intensities it measures will always be larger than for fiber B. As in the calculations above, the intensity measured by fiber A is expressed as the sum of actual intensity and error, or $I_A' = I_A + \Delta I$. The measured distance is then $$R' = \frac{\Delta R}{(I_A'/I_B)^{\frac{1}{2}} - 1} = \frac{\Delta R}{[(I_A + \Delta I)/I_B]^{\frac{1}{2}} - 1}$$

The error is $$\epsilon = 1 - \frac{(\Delta R/R)}{(1 + \Delta R/R)(1 + \Delta I/I_A)^{\frac{1}{2}} - 1}$$

At the minimum distance $R_{min}$, the largest intensity signal is observed, the gain of the detection system is set so that this corresponds to saturation. Then the signal to noise ratio for fixed background noise or digitization noise is $S = I_A(R_{min})/\Delta I$. From the inverse-square law, $I_A(R_{min}) = I_o/R_{min}^2$ and $I_A(R_{max}) = I_o/R_{max}^2$, so $$\frac{I_A(R_{min})}{\Delta I} = \frac{I_A(R_{max})}{\Delta I} \frac{R_{min}^2}{R_{max}^2}$$

Substituting this into the error expression and solving for the resolution S gives $$S = \frac{1}{2} \frac{R_{max}^2}{R_{min}^2} \frac{(R_{max}/\Delta R) + 1}{1/(1-\epsilon) - 1}$$

Figure 7:
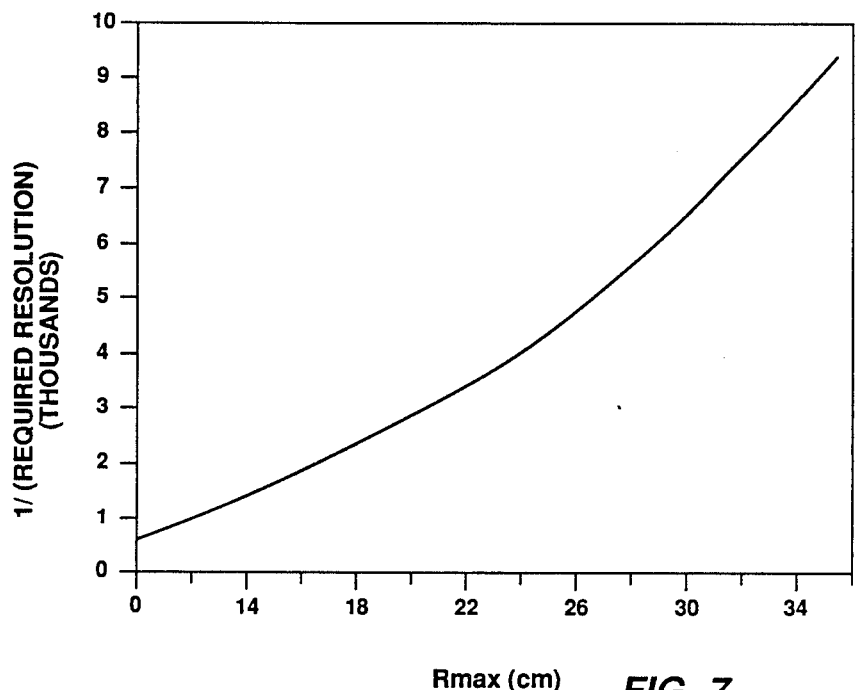
FIG. 7 illustrates the required detection system resolution S as a function of $R_{man}$.
Figure 8:
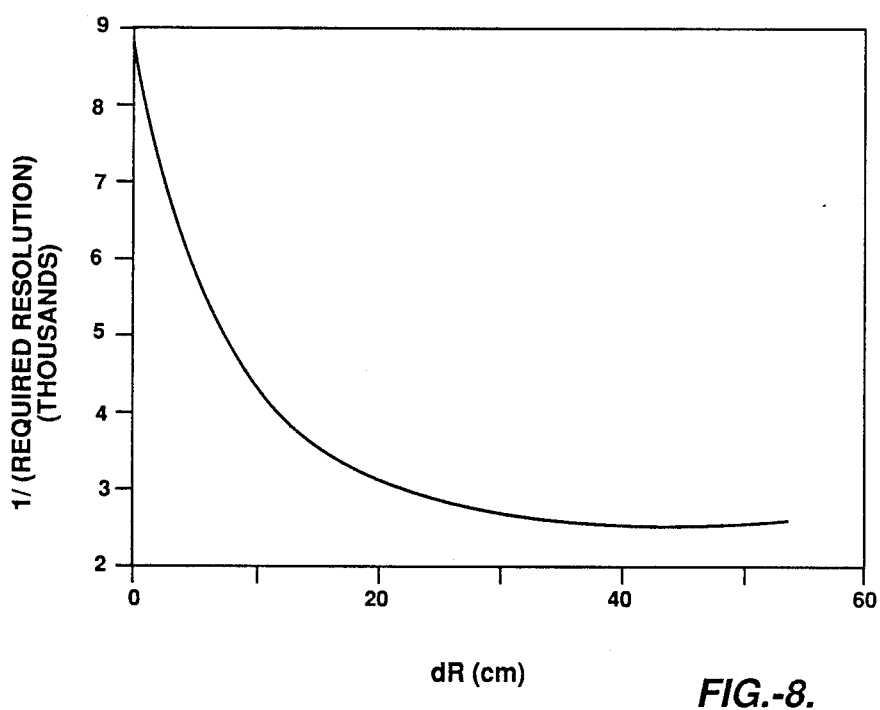
FIG. 8 illustrates the required detection system resolution S as a function of $\Delta R$.
Figure 9:
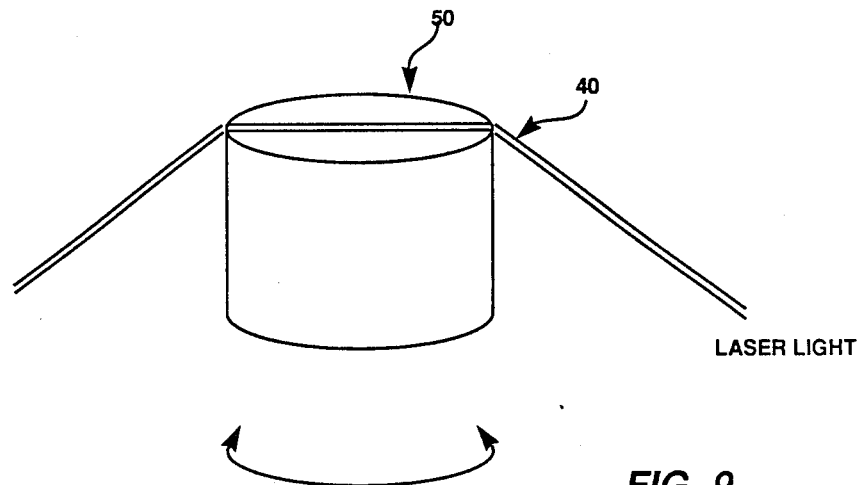
FIG. 9 illustrates a dynamic mode mixer used in conjunction with a laser light source and fiber optic used to image the light on the surface under study.

This gives the resolution required for a maximum error of $\epsilon$ over the range $R_{min}$ to $R_{max}$ for a given $\Delta R$. This is illustrated in FIGS. 7 and 8, where the resolution is graphed as a function of $R_{max}$ and as a function of $\Delta R$. The required resolution is a weak function of the separation distance $\Delta R$, but increases rapidly with the ratio of $R_{max}$ to $R_{min}$. In FIG. 7, $\epsilon \leq 0.1\%$, $R_{min} = 10$ cm and $\Delta R = 4.9$ cm; in FIG. 8, $\epsilon \leq 0.1\%$, $R_{min} = 10$ cm and $R_{max} = 20$ cm.

This high resolution requirement is intuitively reasonable, by the following argument. For a given resolution in the distance measurement, the absolute intensity measurement must be of about the same resolution. This must be true at the maximum distance, where the signal is smallest, and at the minimum distance, where it is larger by the ratio of the distances squared. Thus, for example, if 0.1% resolution in the distance measurement is desired, and the ratio of minimum to maximum distance is 2 to 1, then a dynamic range of about 4000 to 1 is required. The detection system will be at saturation for the minimum distance intensity measurement, and the resolution in the intensity measurement at the maximum distance will be 1000 to 1.

The foregoing analysis of the sensing process provides a means of optimizing sensor performance over a wide range of distances, accuracies, and rates. An example can give some idea of the variety of applications for which this sensing scheme can be employed. We will specify a typical moderate-cost hardware set-up, and show that various ranges and resolution can be achieved with this set-up by choosing the appropriate sensor parameters.

We will choose a 5 mW laser diode $\lambda = 700$ nm) as the light source and silicon photodiodes with preamplifiers as the detectors. The collection fibers will have 400 $\mu$m diameters. A 12-bit analog-to-digital converter will measure the photodiode outputs. We will assume that the measurement surface has about 35% reflectance, follows a Lambertian reflectance function, and that the sensor will be mounted about 10° from normal to this surface. Following the equations developed above, if we choose $\Delta R = 10$ cm and a 1 kHz measurement interval, at the shot noise limit the sensor could measure a 5 cm range (from 5 to 10 cm) with 0.1% accuracy. Alternatively, if we choose $\Delta R = 55$ cm, we could measure a 60 cm range (35 to 95 cm) with 1% accuracy. By increasing the averaging time for each measurement tenfold (100 Hz measurement frequency) and using $\Delta R = 55$ cm, we can increase the accuracy for this 60 cm range to 0.25%. This example shows that for a given hardware configuration it is possible to trade off among range, accuracy, and rate to adapt the sensor to a wide variety of applications. By choosing other light sources, detectors, fiber diameters, etc., a much larger range of applications becomes possible.

A prototype fiber sensor has been constructed and tested. The fiber used for both illumination and collection was 100 $\mu$m step-index quartz fiber. All three fibers were mounted adjacent to each other on an aluminum block with $\Delta R = 100$ mm. Helium-Neon laser light was coupled into the illumination fiber, and the emerging light was focused onto the measurement surface by a 13 mm focal length spherical lens attached to the edge of the block. The lens was positioned to focus the light spot at the center of the measurement range. The measurement surface for this demonstration was a piece of white paper, and the sensor was held at an angle of about 15° with respect to the measurement surface normal. The light from each collection fiber was detected with a silicon photodiode with a 250$\Omega$ load resistor, then read out on a DVM. The distance between the sensor and the surface was varied from 25 mm to 35 mm while the output signals from the photodiodes were recorded at 1 mm intervals.

Speckle effects were controlled with a dynamic mode mixer. The light source fiber was mounted rigidly at two points while an oscillating galvanometer bent the fiber alternately in opposite directions around its shaft (FIG. 8). This redistributed energy between various modes within the fiber, which altered the amplitude distribution of the light striking the measurement surface, and thus the speckle pattern. A single cycle of the galvanometer produced sufficient mode mixing to make speckle cells disappear and reappear at different locations many times. The resulting intensity at the collection fiber positions, when averaged over several galvanometer cycles approximated a Lambertian distribution.

Figure 10:
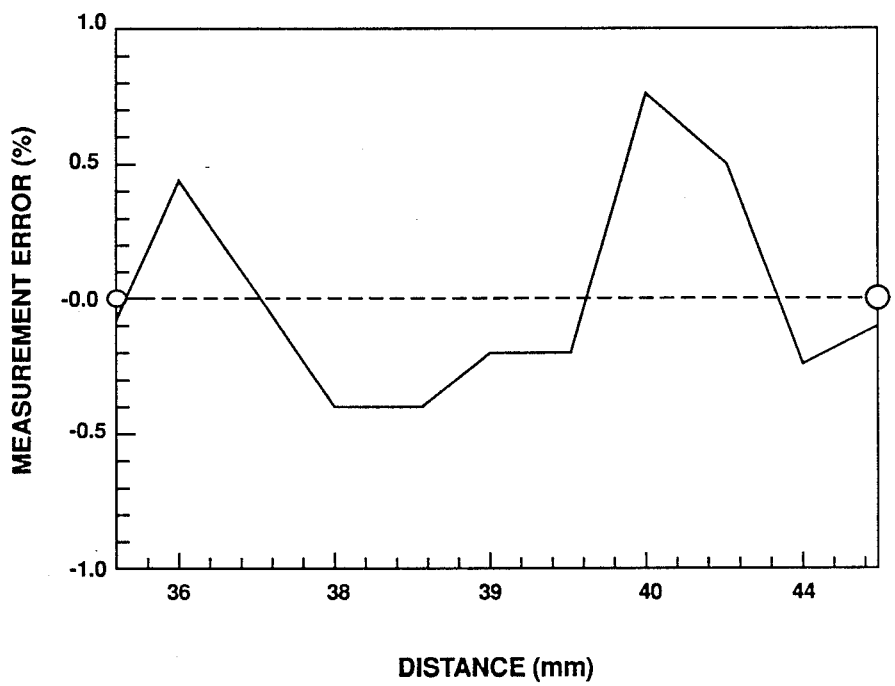
FIG. 10 illustrates experimental results for a prototype distance sensor.

The measured distance to the surface was calculated from the formula $$R = \frac{\Delta R}{(I_A/I_B)^{\frac{1}{2}} - 1}$$

where C is a calibration constant determined by averaging the quantity $[(\Delta R/R_{actual})+1]/(I_A/I_B)^{\frac{1}{2}}$ over all the data points $\{R_{actual}, I_A, I_B\}$. As shown in FIG. 10, all the measured values for R were within 1% of the true distance $R_{actual}$.

This preferred embodiment comprises a simple, inexpensive fiber optic displacement sensor using the inverse-square attenuation of light reflected from a diffuse surface. Sensor parameters can be optimized for numerous sensing ranges and accuracies; in a typical application, an accuracy of $\pm 0.1\%$ can be obtained over a 5 cm range. This compares favorably with other non-contact measurement techniques such as ultrasound and triangulation.

A prototype of this sensor has been constructed and tested. Arrays of these devices which sense curvature or orientation of a surface can be easily built since a single laser can be used to drive a large number of these sensors. This device is particularly suited to industrial applications which require simultaneous displacement measurements at multiple locations.

What is claimed is:

1. A non-contact displacement sensor for measuring distance from the sensor to a surface undergoing analysis, comprising
   means for directing a focused light output on a surface under study,
   collecting means for detecting the intensity of the light reflected from the surface,
   the collecting means comprising a pair of optical detectors (A, B) having detecting surfaces located at different distances (R, R+$\Delta$R) from the surface so that the collected intensities are $$I_A = I_{OA}/R^2, \quad I_B = I_{OB}/(R+\Delta R)^2$$

means for providing the same solid angle of reflected light to both detectors of said pair of detectors comprising a beam splitter for receiving said solid angle of light, and dividing said light into first and second components, a first said component passing from said splitter into one said detector, the second component exiting a side of said beam splitter and being deflected at an angle to reach the other said detector means for calculating the distance from said detection means to said surface based on the formula $I=I_o/R^2$ where R is the distance from said detector to the surface under study and Io is the light intensity measured at a unit distance.

2. A non-contact sensor as in claim 1 wherein the detecting surfaces of the collecting means are mounted colinearly so that they collect light scattered into the same small solid angle, so that $$R = \frac{\Delta R}{(I_A/I_B)^{\frac{1}{2}} - 1}.$$

3. A non-contact sensor as in claim 1 wherein the light directing means comprise a laser having an output coupled through an optical fiber, and a dynamic mode mixing means is coupled to said optical fiber, the light energy thereby being redistributed over the spot image on the surface under study.

4. A non-contact sensor as in claim 3 wherein the dynamic mode mixer is operable to redistribute the light over the surface of the spot several times during each measurement cycle.

* * * * *